United States Patent [19]
Hield et al.

[11] Patent Number: 5,694,765
[45] Date of Patent: Dec. 9, 1997

[54] SHAFT POWER TRANSFER IN GAS TURBINE ENGINES WITH MACHINES OPERABLE AS GENERATORS OR MOTORS

[75] Inventors: Paul M. Hield, Bristol; John M. Cundy, Derby; Ronald A. Midgley, Derby; Arnold C. Newton, Derby; Arthur L. Rowe, Derby, all of England

[73] Assignee: Rolls-Royce plc, London, England

[21] Appl. No.: 392,872

[22] PCT Filed: Jul. 5, 1994

[86] PCT No.: PCT/GB94/01450

§ 371 Date: Mar. 28, 1995

§ 102(e) Date: Mar. 28, 1995

[87] PCT Pub. No.: WO95/02120

PCT Pub. Date: Jan. 19, 1995

[30] Foreign Application Priority Data

Jul. 6, 1993 [GB] United Kingdom ............... 9313905

[51] Int. Cl.[6] ............................................. F02C 1/06
[52] U.S. Cl. ........................... 60/39.163; 60/39.161; 60/396
[58] Field of Search .................. 60/39.161, 39.163, 60/39.07, 39.33, 39.141, 396; 415/123

[56] References Cited

U.S. PATENT DOCUMENTS

| | | | |
|---|---|---|---|
| 2,802,334 | 8/1957 | Fletcher et al. | 60/39.161 |
| 3,188,807 | 6/1965 | Rogers | 60/39.163 |
| 3,274,768 | 9/1966 | Klein et al. | |
| 3,286,543 | 11/1966 | Porter | 60/39.163 |
| 3,385,064 | 5/1968 | Wilde et al. | 60/39.161 |
| 3,498,057 | 3/1970 | Kronogard et al. | 60/39.163 |
| 3,514,945 | 6/1970 | Austin | |
| 3,597,921 | 8/1971 | McBurnett | 60/396 |
| 3,834,161 | 9/1974 | Quigley, Jr. et al. | 60/39.161 |
| 3,867,813 | 2/1975 | Leibach | 60/39.33 |
| 3,899,877 | 8/1975 | Flanigan et al. | 60/39.141 |
| 4,041,696 | 8/1977 | Morrison | 60/39.141 |
| 4,062,185 | 12/1977 | Snow | 60/39.163 |
| 4,062,186 | 12/1977 | Snow et al. | 60/39.141 |
| 4,282,709 | 8/1981 | Kronogard | 60/39.163 |
| 4,651,521 | 3/1987 | Ossi | |

FOREIGN PATENT DOCUMENTS

| | | |
|---|---|---|
| 0 065 855 | 12/1982 | European Pat. Off. |
| 0 200 178 | 11/1986 | European Pat. Off. |
| 1 272 047 | 7/1968 | Germany |
| 759606 | 10/1956 | United Kingdom |
| 819489 | 9/1959 | United Kingdom |
| 827780 | 2/1960 | United Kingdom |
| 971690 | 9/1964 | United Kingdom |
| 1136584 | 12/1968 | United Kingdom |
| 1 201 767 | 8/1970 | United Kingdom |
| 1 340 363 | 12/1973 | United Kingdom |
| 1 523 640 | 9/1978 | United Kingdom |
| 2 143 588 | 2/1985 | United Kingdom |
| 2 226 598 | 7/1990 | United Kingdom |

Primary Examiner—Timothy Thorpe
Assistant Examiner—Ted Kim
Attorney, Agent, or Firm—Oliff & Berridge

[57] ABSTRACT

A multispool gas turbine engine for an aircraft application includes a transmission system which is operative to transfer power between relatively rotatable engine spools. In a first mode the transmission system is operative to transfer power from the engine's low pressure spool to its high pressure spool and thereby improve the engine's in-flight relight characteristics; in a second mode it is operative to transfer power from the engine's intermediate pressure spool to its high pressure spool to improve engine part speed performance; and in a third mode to transfer power from the engine's high pressure spool to its intermediate pressure spool to assist in ground starting. With each shaft is an associated flow displacement machine (64,66,62) operable as a pump or motor. In other embodiments, a differential is employed for the power transfer between spools.

31 Claims, 7 Drawing Sheets

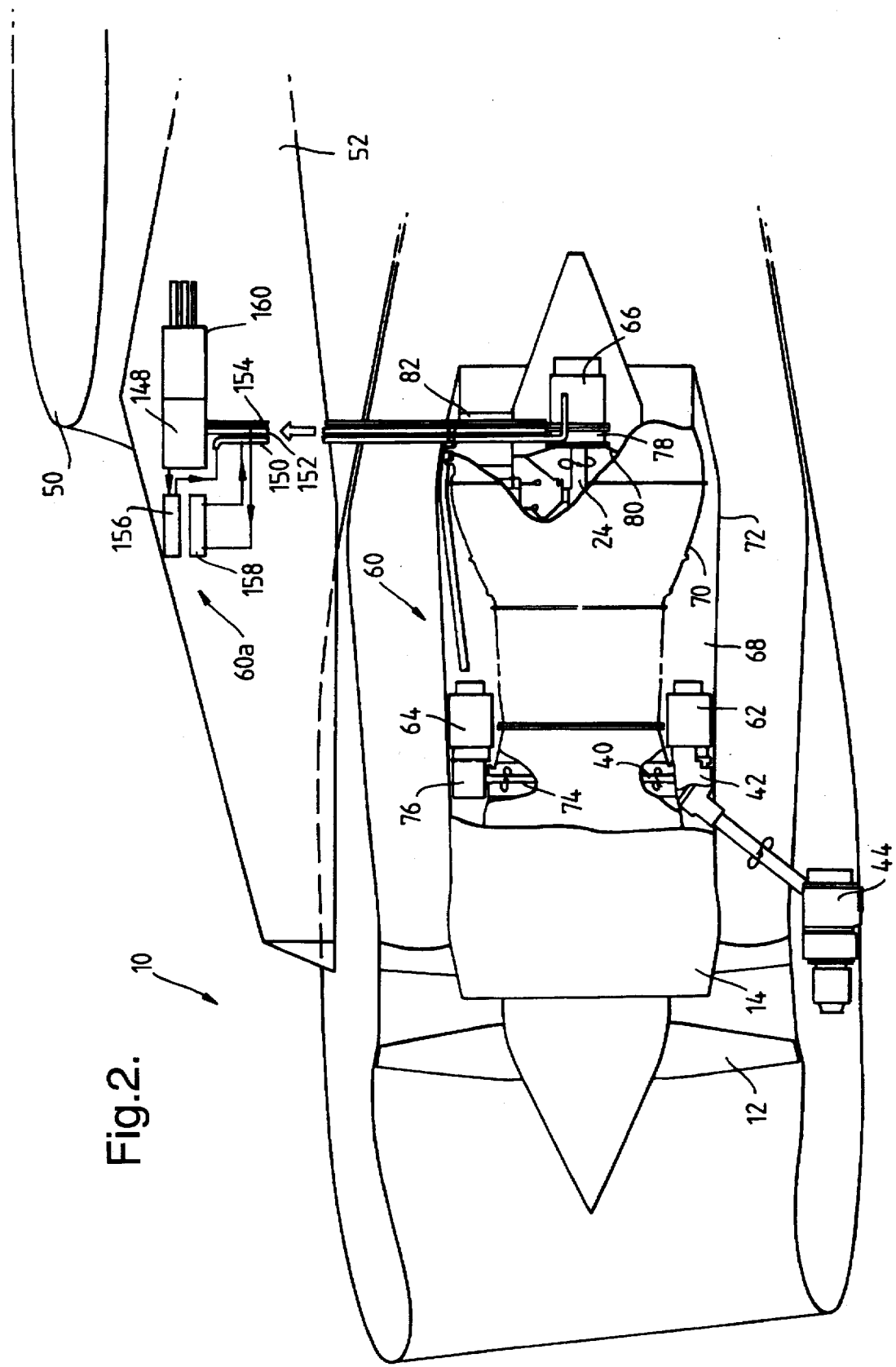

SHAFT POWER TRANSFER IN GAS TURBINE ENGINES WITH MACHINES OPERABLE AS GENERATORS OR MOTORS

This invention relates to gas turbine engine transmission systems. In particular the invention concerns transmission systems suitable for effecting power transfer between independently rotatable engine shafts in multispool gas turbine engines.

A multispool gas turbine 10 having a conventional transmission system is shown schematically in FIG. 1. The gas turbine engine shown comprises, in flow series, a front fan assembly 12 and a core engine 14. The engine is of the ducted fan by-pass type and has three relatively rotatable spools including a low pressure spool 16, an intermediate pressure spool 18, and a high pressure spool 20. The low pressure spool includes a fan 12, a multistage turbine assembly 22 located at the downstream end of the core engine, and an interconnecting load transmitting shaft 24 rotatable about engine axis 26. The intermediate pressure spool 18 includes a multistage axial flow compressor 28, a turbine rotor assembly 30, and a hollow interconnecting shaft 32 concentrically disposed around engine shaft 24. The engine's high pressure spool 20 similarly includes a multistage axial flow compressor 34, a turbine rotor assembly 36, and an interconnecting shaft 38 concentric with engine shafts 32 and 24.

The transmission includes a radial power off-take shaft 40, a so called step-aside gearbox 42 drivingly connected to the engine's high pressure spool by the drive shaft 40, an externally mounted accessory gearbox 44, and a drive shaft 46 connecting the accessory gearbox to the step-aside gearbox 42. Various accessories (not shown), both engine and aircraft, are mounted on the accessory gearbox 44 so as to be driven by the transmission during engine operation.

This configuration is found in many ducted fan multispool gas turbine engines. It has the advantage over other configurations in that it allows the same transmission system to be utilised for transferring engine starter torque to the engine's high pressure spool during ground starting, as well as engine power to the accessories during self sustained operation. There is a drawback, however, with this type of arrangement.

Following an in-flight combustion flame out condition, aircraft mounted gas turbine engines typically rely upon the free rotation of the engine spools to generate sufficient core engine flow to support combustion and rapid engine acceleration at re-light. In arrangements where the accessories are driven by the engine's high pressure spool this capability can be significantly reduced. During periods of extinguished engine operation the additional load imposed by the accessories reduces the free rotational speed of the spool, and as a result the airflow through the core engine. One way of improving the re-light characteristics of ducted fan gas turbine engines is disclosed in our co-pending International Patent Application GB92/01179. This patent application discloses an aircraft mounted gas turbine engine having an accessory drive linked to the engine's low pressure spool. The arrangement ensures that in the event of a flame-out condition the engine's windmilling fan continues to drive the accessory gearbox. Under these conditions the power available from the windmilling is significantly greater than that required by the accessories and as such the accessory load impacts far less on the core engine flow.

Another method involves transferring power to the high pressure spool of an extinguished engine from a source external to the engine. Generally this is achieved using bleed air from a neighbouring engine to drive the starter of the extinguished engine. The power transferred augments that of the freely rotating high pressure spool and as such causes the spool to rotate faster, improving the chances of successful re-light. A major drawback with this is that it relies on the continued functioning of at least one other engine.

One way of overcoming this would be to utilise power from the windmilling fan of the extinguished engine, instead of bleed flow energy from the neighbouring engine, to accelerate the engine spool.

Accordingly the present invention has for one of its objectives improvements to the in-flight re-light performance of aircraft mounted gas turbine engines, in particular the provision of a transmission system which is capable of transferring power from the engine's low pressure spool to it's high pressure spool following a combustion flame-out condition.

Another object of the present invention is to improve engine part load performance.

Since the aerodynamic characteristics of gas turbine engine compressor systems are designed for optimum operation at a particular condition, it is often necessary to provide some form of airflow control to avoid flow breakdown at part speed operation. This is usually achieved using compressor bleed wherein a portion of compressor flow is bleed from the engine to avoid compressor surge during part speed operation. Although effective in controlling the delivery flow pressure of individual compressor stages, bleed flow control has a number of drawbacks, the main disadvantage being its impact on cycle efficiency. Variable geometry is another way of achieving flow control at off-design conditions. Typically variable angle aerofoils are provided in the compression systems of gas turbine engines. By rescheduling the aerofoil angles, the flow characteristics of individual compressor stages can be substantially altered. Again although effective, variable geometry flow control has a number of disadvantages. The additional hardware tends to add appreciably to the overall cost, weight and complexity of the engine.

It is well known that similar control could be achieved by re-scheduling the rotational speed of the individual engine spools at part speed operation. For example, by respectively increasing and decreasing the rotational speeds of the high and intermediate pressure spools of a three spool engine, cycle efficiency at part speed operation could be substantially improved. Unfortunately this is not possible with conventional engines since the rotational speed of each engine spool is determined by the fixed aerodynamics of the turbine driving it.

Accordingly the present invention has for a second objective improvements to the part speed performance of multispool gas turbine engines, in particular the provision of a transmission system which is capable of re-scheduling the rotational speeds of individual engine spools at part speed operation.

A further object of the present invention is to improve engine ground start performance.

Conventionally ground starting of multispool gas turbine engines is effected by transmitting torque to the engine's high pressure spool via the engine accessory gearbox. Once sufficient core flow is developed ignition will take place. In general the time to ignition will depend on factors such as accessory loading and engine aerodynamics. In future engine applications there is a possibility that this period could increase, when compared with todays standards, as more and more demands are made on the accessory drive systems.

Accordingly, the invention has for a third objective improvements to the ground starting abilities of multispool gas turbine engines, in particular the provision of a transmission system which is capable of transferring engine starter torque to more than one of the engine spools during ground starting.

In its broadest sense the invention provides a gas turbine engine having at least two independently rotatable engine spools, comprising power transmission means operative to transfer power from at least one of the spools to at least another of the spools.

Preferably the power transmission means provides for selective power transfer between engine spools, and also for both forward and reverse power transfer between engine spools.

Preferably the gas turbine engine includes a plurality of engine driven accessories and the transmission means is adapted to transfer power from at least one of the engine spools to drive the accessories.

Preferably the gas turbine engine is for mounting on an aircraft having a plurality of engine driven accessories and the transmission means is further adapted to transmit power from at least one of the engine spools to drive the aircraft accessories.

BRIEF DESCRIPTION OF THE DRAWINGS

The invention will now be described in greater detail with reference, by way of example only, to the accompanying drawings, in which:

FIG. 2 is a partially sectioned partially cut-away side view of a gas turbine engine similar to that of FIG. 1, but incorporating a transmission system according to a first embodiment of the invention, FIG. 3 schematically represents the transmission system of the first embodiment of the invention.

DETAILED DESCRIPTION

Referring to FIG. 2, a ducted fan gas turbine engine 10 is suspended from the wing 50 of an aircraft by a pylon 52.

Figure 1:
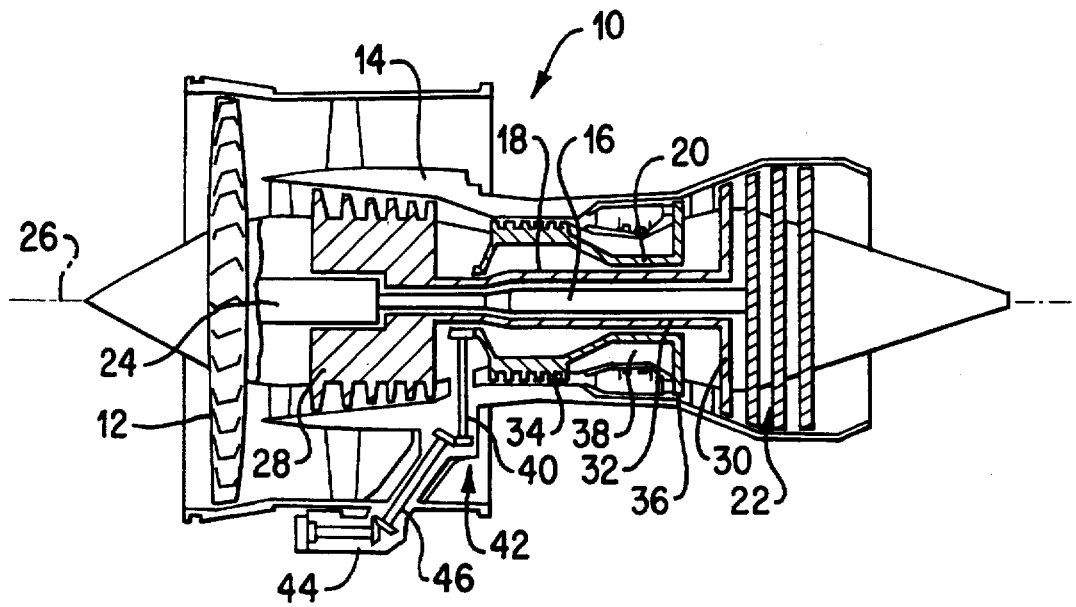
FIG. 1 is a schematic view of a multispool gas turbine engine incorporating a transmission system of the prior art.

The engine 10 is of identical construction to that shown in FIG. 1 having a front fan 12, a core engine or gas generator 14, and three independently rotatable spools 16, 18 and 20. Unlike FIG. 1, FIG. 2 shows the engine in part cut-away view, the majority of the engine detail having been omitted for clarity.

The engine shown includes a transmission system 60 in accordance with a first general embodiment of the invention.

Essentially the transmission comprises three hydraulic flow displacement machines 62, 64 and 66, each of which is drivingly connected to a respective one of the engine spools. All three machines are arranged in fluid supply communication to define a hydrostatic transmission system, the exact configuration of which will be described later.

The machines 62, 64 and 66 are of the type which may be operated in a positive displacement mode as pump, converting a mechanical work input into a pressurised hydraulic output, and in a negative reverse mode as a motor, converting a pressurised hydraulic input into a mechanical work output. These machines are commonly found in hydrostatic transmission systems. Reversible flow swash plate type machines having a variable flow capacity are preferred in this embodiment for greater operational flexibility.

With reference to FIG. 2, a first of the flow machines 62 is mounted on the engine's step-aside gearbox 42. Together with radial drive shaft 40 the gearbox 42 connects the flow machine 62 to the engine's high pressure spool 20. The gearbox 42 is provided with bevel gearing (not shown) to turn the drive from shaft 40 through 90 degrees so that the flow machine 62, and its associated pipework (also not shown), can be located within the region 68 defined between core engine casing structure 70 and cowling 72. In a similar manner a second of the hydraulic flow machines 64 is drivingly connected to the engine's intermediate pressure spool 18. A second radial drive shaft 74 and a reduction gearbox 76 are provided to connect hydraulic machine 64 with the engine's intermediate pressure spool 18. Like step-aside gearbox 42 gearbox 76 is mounted to core engine casing structure 70, together with hydraulic machine 64, inboard of cowling structure 72. In addition to reduction gearing, gearbox 76 also includes bevel gearing (not shown) for turning the drive from shaft 74 through 90 degrees. A third of the hydraulic flow machines 66 is drivingly connected to the downstream end of the low pressure spool engine shaft 24. A reduction gearbox 78 is provided between the engine shaft 24 and the hydraulic machine 66. The gearbox is mounted to fixed engine structure 72 via supports 80 and vanes 82 positioned at the downstream end of the core engine. This arrangement is preferred since it provides for both aerodynamic positioning of the flow displacement machine 66 and operational accessibility.

Figure 3:
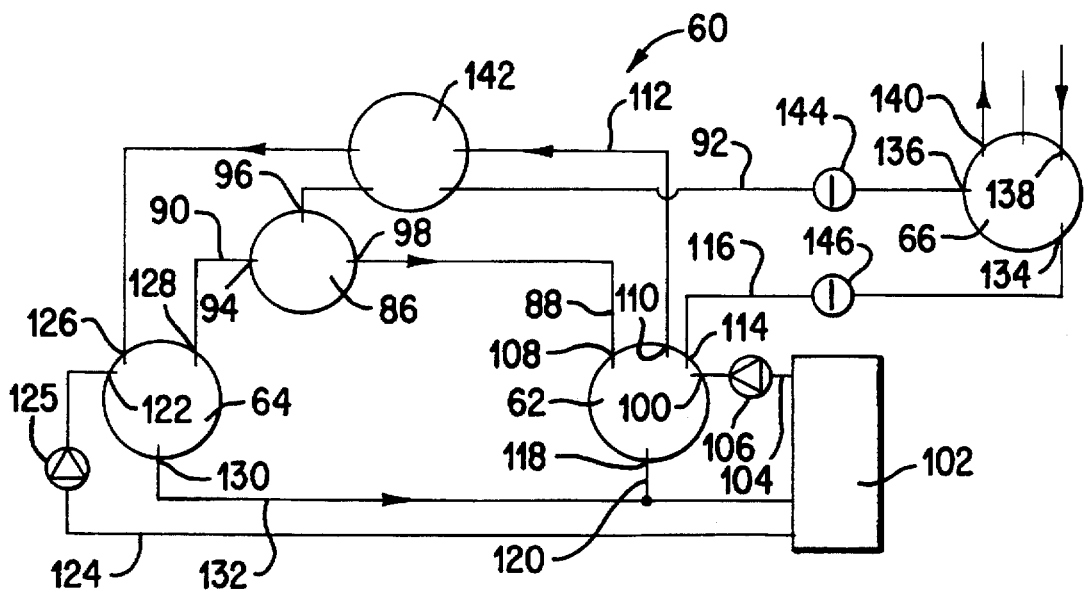

Referring now to FIG. 3 which shows schematically the layout of the hydrostatic transmission 60. The transmission shown may be integral with the engine oil system or separate if desire. As shown each of the hydraulic machines 62, 64 and 66 are connected to a flow control 86 by separate hydraulic lines 88, 90 and 92 respectively. The flow control 86 has a first inlet 94 adapted to receive flow from machine 64 along line 90, a second inlet 96 adapted to receive flow from machine 66 along line 92, and an outlet 98 for delivering flow to machine 62 along line 88. In a like manner machine 62 includes a first inlet 100 connected to a tank 102 by means of a hydraulic line 104 having a non-return valve 106 positioned within it, a second inlet 108 for receiving line 88, a first outlet 110 connected to machine 64 via a hydraulic line 112, a second outlet 114 connected to machine 66 via a hydraulic line 116, and a further outlet 118 connected to a drain line 120 to tank 102. The second machine 64 includes a first inlet 122 connected to tank 102 along a line 124 having a non return valve 125, a second inlet for receiving line 112, a first outlet connected to flow control 86 via line 90, and a second outlet 130 to the tank 102 via a drain line 132. The third machine 66 includes an inlet 134 connected to line 116 from machine 62 and an outlet 136 connected to the flow control 86 by line 92. The transmission system 60 is further provided with a cooler 142 for cooling the working fluid passing along lines 92 and 112 during operation, and in addition includes shut-off valves 144 and 146 in lines 92 and 116 respectively for isolating machine 66.

During engine operation the transmission 60 may be configured to transfer power between selective engine spools. With reference to FIG. 3, in a first mode the transmission is configured for power transfer between the low pressure and high pressure engine spool, the configuration that would be selected following an in-flight combustion flame-out condition. In this mode of operation the hydraulic machine 66 connected to the engine's low pressure spool is configured to work as a pump, and the hydraulic machine 62 connected to the engine's high pressure spool as a motor powered by working fluid energised by the pump 66. When the shut-off valves 144 and 146 open working fluid will pass from the pump 66 through the flow control 86 to power the motor 62. In this mode the flow control will ensure that hydraulic machine 64 is isolated from pressurised working fluid so that all available power will pass to the engine's high pressure spool.

In a second mode the transmission is configured for power transfer between the engine's intermediate pressure and high pressure spool, the configuration that would be selected for part speed operation. In this mode the hydraulic machine 64 connected to the engine's intermediate pressure spool is configured to work as a pump, and the hydraulic machine 62 connected to the engine's high pressure spool as a motor powered by working fluid energised by the pump 64. In this mode the flow control 86 isolates the hydraulic machine 66 so that all the pressurised working fluid passes to the motor 62 along lines 88 and 90 with the return flow passing back to the pump 64 along 112.

In a third mode the transmission is configured for power transfer between the engine's high pressure and intermediate pressure spool, the configuration that would be selected during ground starting. In this mode the hydraulic machine 62 connected to the engine's high pressure spool is configured to work as a pump, and the hydraulic machine 64 connected to the engine's intermediate pressure spool as a motor powered by working fluid energised by the pump 62. In this mode the flow control 86 isolates the hydraulic machine 66 so that all the pressurised working fluid passes to the motor 64 along line 112 with the return flow passing back to the pump 62 along lines 88 and 90.

In order to reduce engine weight the engine of FIG. 2 is provided with an additional hydrostatic transmission 60a. A further hydraulic flow displacement machine 148 is mounted in the pylon structure 52 and drivingly connected to a hydraulic pump 160 adapted to power the aircraft hydraulic systems. Collectively the flow displacement machine 148 and pump 160 define an engine to aircraft power transfer means. With reference now to FIG. 3, the flow displacement machine 66 is provided with an additional inlet 138 and an outlet 140 for connection to machine 148. A first hydraulic line 152 connects the outlet 140 to machine 148, and a second hydraulic line 150 connects machine 148 to the inlet 138 of machine 66 via a cooler 156. A third hydrostatic line 154 is provided to connect lines 150 and 152 to a tank.

In the transmission 60a hydraulic machine 66 is permanently configured as a pump and machine 148 as a motor. At all times during engine operation the pump 66 delivers pressurised working fluid to the motor 148 to drive the aircraft hydraulic systems.

The addition of transmission 60a to the engine of FIG. 2 enables the aircraft hydraulic pump 160 to be positioned closer to the hydraulic systems it drives. By moving the pump 160 from the accessory gearbox 44 to the pylon structure 52 considerable pipework and hence weight can be removed from the engine.

Figure 4:
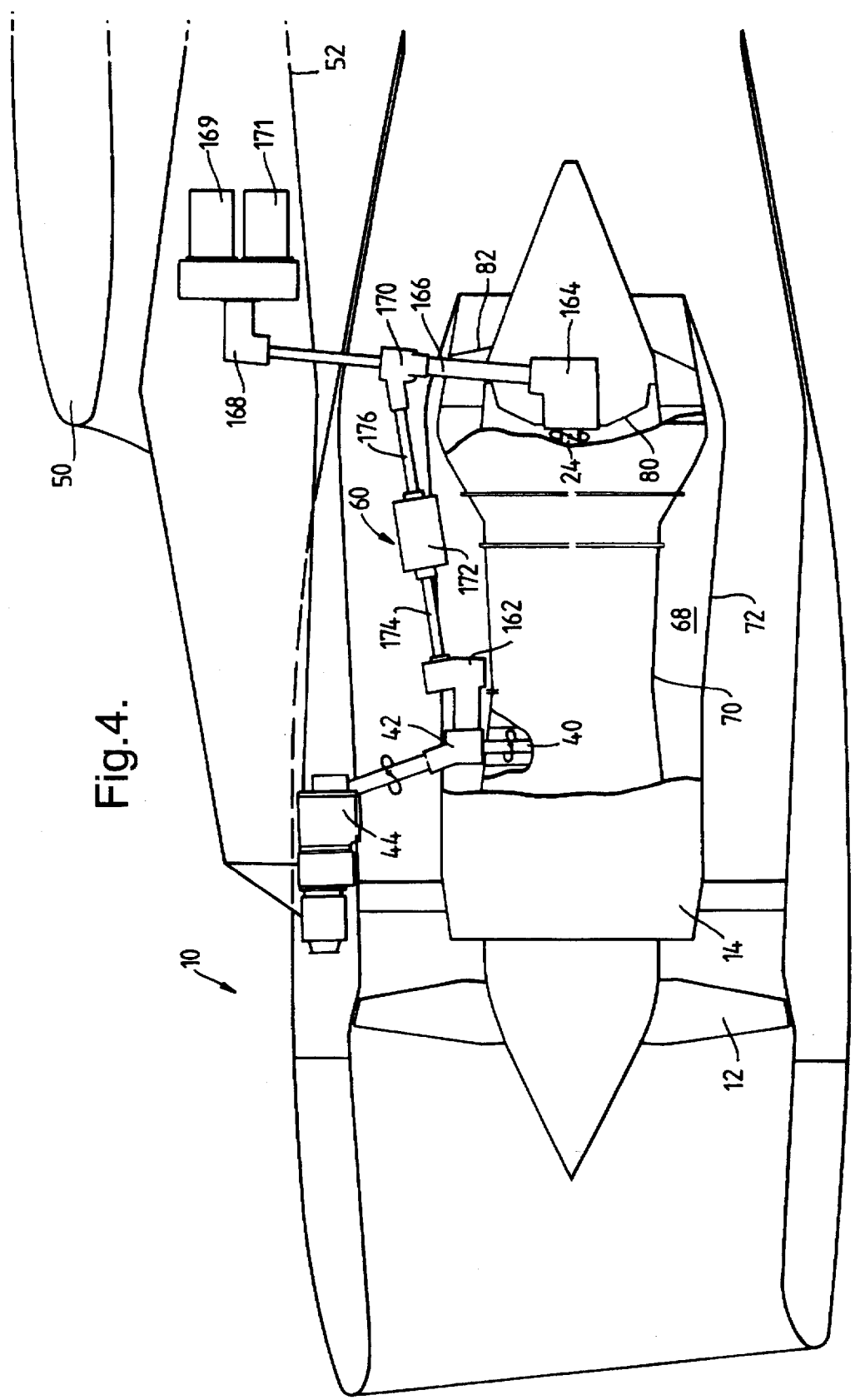
FIG. 4 shows the same multispool gas turbine engine as FIG. 2 incorporating a transmission system according to a second embodiment of the invention, FIG. 5 schematically represents a multispool gas turbine engine similar to that of FIG. 2 incorporating a transmission system according to a third embodiment of the invention.

Referring now to FIG. 4 which shows the same gas turbine engine as FIG. 2, but with a transmission system 60 in accordance with a second embodiment of the invention.

The transmission shown connects only two of the engine spools, the high pressure spool and pressure spool 20 and 16 respectively. As shown the transmission comprises first and second reduction gearboxes 162 and 164 drivingly connected to the engine's high and low pressure spools. Reduction gearbox 162 is connected to the engine's high pressure spool through step-aside gearbox 42, and reduction gearbox 164 to the engine's low pressure spool at the downstream end of shaft 24 as in the previous embodiment. Gearbox 164 includes bevel gearing (not shown) to transfer the drive from shaft 24 to a radial output shaft 166. Output shaft 166 is in two parts and extends from the gearbox 164 to a pylon mounted gearbox 168 through a differential 170. This enables the engine's low pressure spool to be used to drive the aircraft hydraulic systems through pumps 169 and 171 in much the same way as disclosed in co-pending International Patent Application 92/01179. In order to integrate the shaft 166 into the transmission the engine's step-aside and accessory gearboxes 42 and 44 are located adjacent the pylon. This way the entire transmission is located on one side of the engine, thereby simplifying the transmission arrangement. A so called axial gear differential constant speed drive 172 together with shafts 174 and 176, which connect the axial gear differential 172 to gearboxes 162 and 170, completes the transmission.

The axial differential drive 172 is of the type commonly used in aircraft electrical power generator systems. These drives are configured so that the majority of power passing through them is passed through a differential gear arrangement, whilst a small proportion is used to drive an integral variable speed hydrostatic transmission. The design of the differential drive is such that it allows two different speed inputs to be mechanically summed to produce a single speed output. The axial differential drive is arranged so that one of speed inputs is the mechanical input to the differential gear itself, and the other the output from the hydrostatic transmission. The drive ratio of the differential drive is infinitely variable by virtue of the variable hydrostatic transmission output.

Accordingly the transmission 60 of the second preferred embodiment operates as follows. During normal engine operation no torque is transferred between engine shafts, the ratio of drive 172 essentially follows the ratio of low pressure spool to high pressure spool speed. The only time the drive 172 deviates from this is following an in-flight combustion flame out condition. Once detected by the engine control (not shown) the ratio of the drive 172 will alter in accordance with power transfer requirements. As previously discussed this will enable the engine's low pressure spool to accelerate the high pressure spool to the re-light condition.

It will be appreciated, of course, that the transmission system 60 could be modified further so that power could be transferred selectively between any two of the engine spools. This could be achieved for example by adding a further axial differential drive gear between the engines high pressure 20 and intermediate pressure spool 18, or alternatively a hydrostatic transmission as in the first preferred embodiment.

Figure 5:
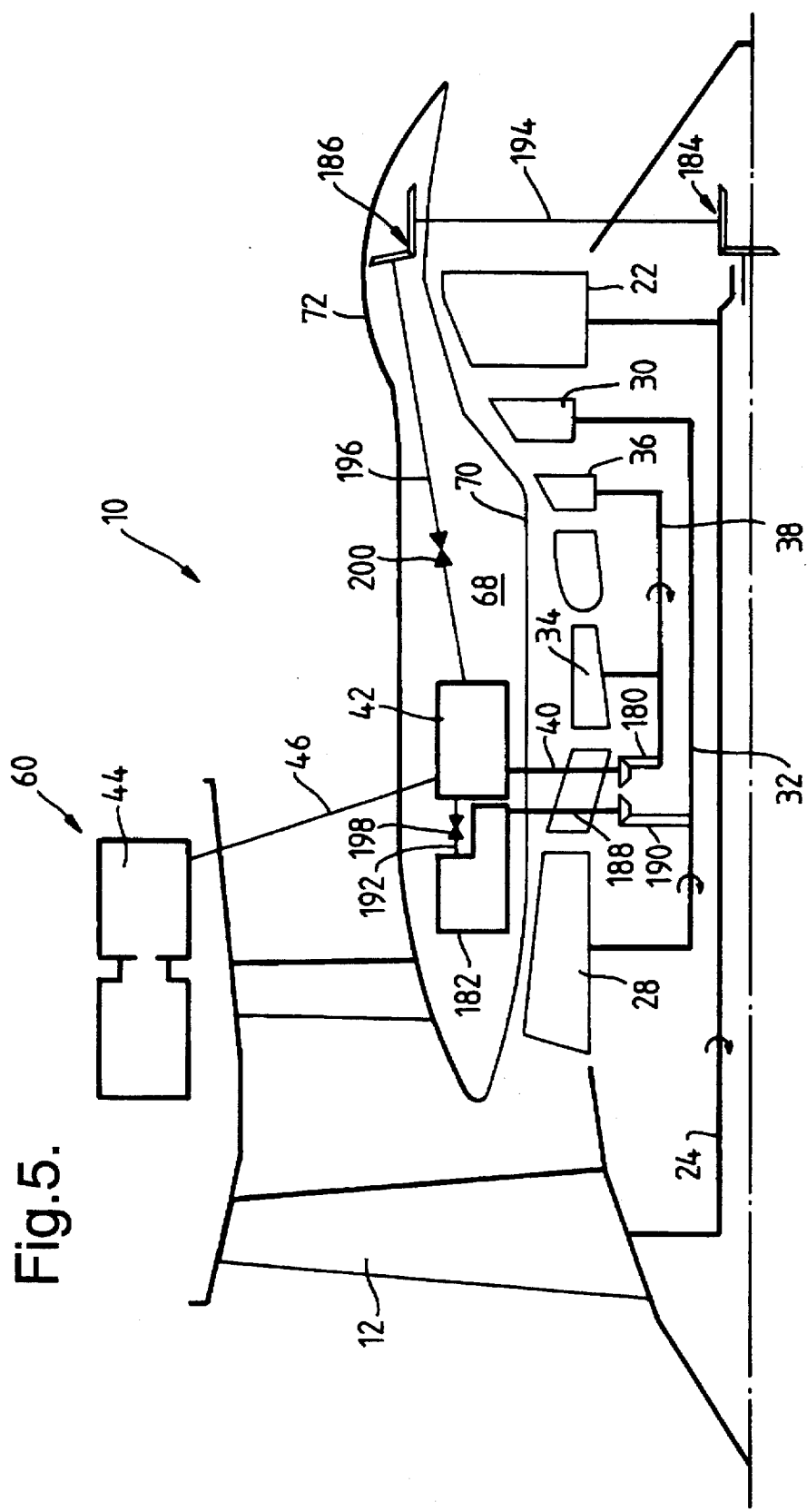

Turning now to FIG. 5 which schematically represents the gas turbine engine of FIG. 1 having a transmission system in accordance with a third embodiment of the invention.

As shown the engine includes all the components of the prior art transmission. The high pressure spool 20 is adapted to drive the engine accessory gearbox 44 via drive shafts 40 and 46 and step aside gearbox 42 as before, and the radial drive shaft 40 is bevelled to the engine's high pressure spool at 180 in the usual way.

In addition, however, the transmission shown in FIG. 5 comprises a reduction gearbox 182 located in region 68 and drivingly connected to the engine's intermediate pressure spool 18, reduction and bevel gearing 184 drivingly connected to the engine's low pressure spool 16 at the downstream end of shaft 24, and bevel gearing 186 positioned radially outwards of gearing 184 in region 68. Gearbox 182 is connected to the engine's intermediate pressure spool 18 by a radial drive shaft 188 bevelled to shaft 32 at 190, and to step aside gearbox 42 by an axial drive shaft 192. In a like manner gearing 186 is connected to gearing 184 by a radial drive shaft 194, and to step-aside gearbox 42 by an inclined drive shaft 196. A clutch assembly 198 is provided in drive shaft 192 so that the drive between the engine's high pressure spool 20 and intermediate pressure spool 18 may be selectively engaged and disengaged. Likewise a second clutch assembly 200 is provided in drive shaft 196 so that the drive between the engine's high pressure spool 20 and low pressure spool 16 may be selectively engaged and disengaged.

During normal engine operation the transmission 60 of FIG. 5 will operate in the same manner as the transmission system of the prior art. With clutch assemblies 198 and 200 disengaged the only drive to accessory gearbox is that taken from the engine's high pressure spool. However, by selective engagement and disengagement of clutch assemblies 198 and 200 it will be seen that power may be transferred between the engine spools, and that the accessory gearbox may be driven by a spool other than the engine's high pressure spool.

From the foregoing it will be seen that engine re-light performance may be improved by engagement of clutch assembly 200 and disengagement of clutch assembly 198 following a flame-out condition. It will be seen also that engine part speed performance may be improved by engagement of clutch assembly 198 and disengagement of clutch assembly 200 during part load operation, and ground starting performance by similar engagement and disengagement prior to engine ignition.

Figure 6:
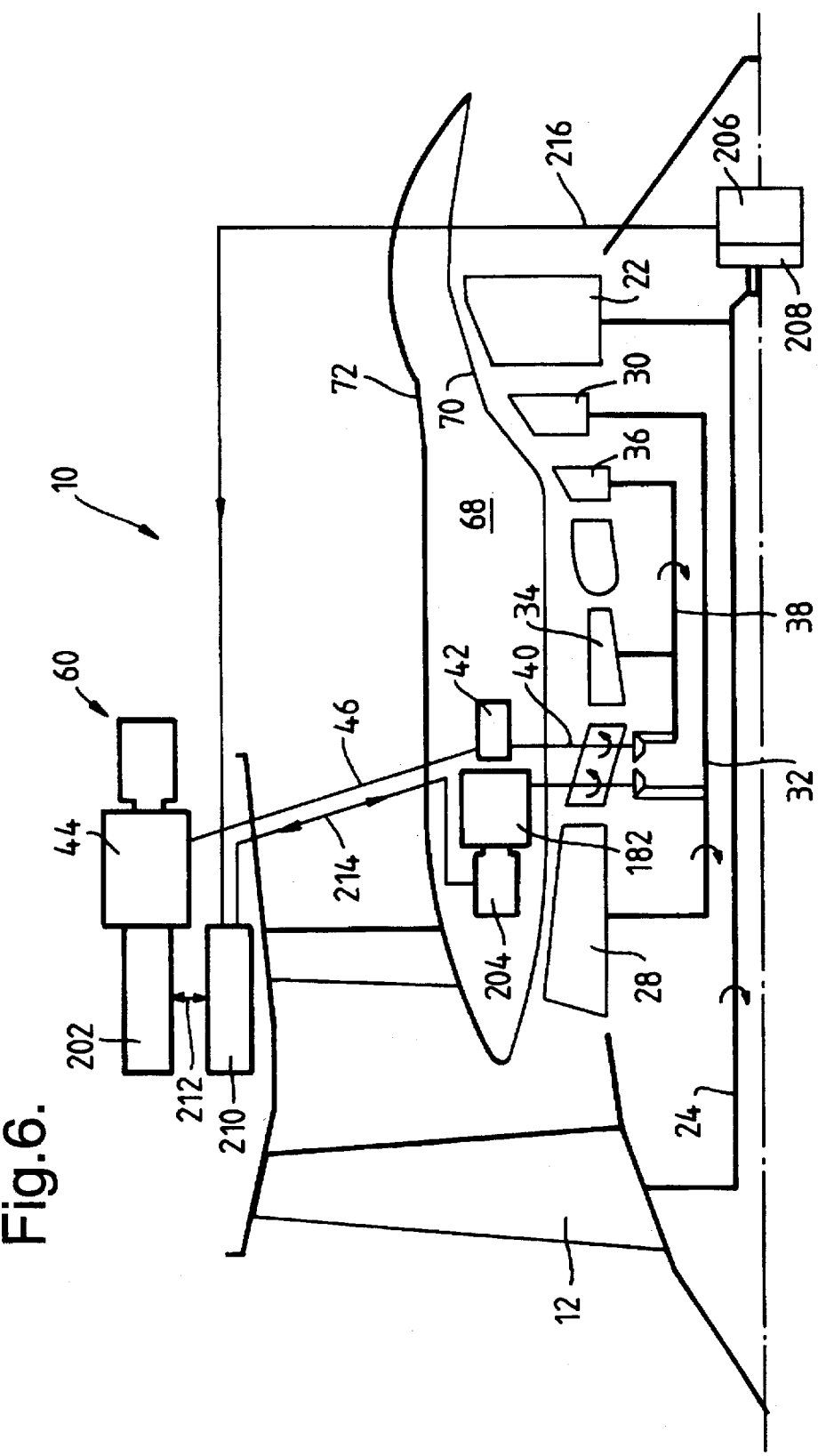
FIG. 6 shows the same multispool gas turbine engine as FIG. 5 incorporating a transmission system according to one aspect of a fourth embodiment of the invention.

A power transmission system 60 in accordance with a first aspect of a fourth embodiment of the invention is shown in FIG. 6. Like FIG. 5, FIG. 6 shows schematically the gas turbine engine of FIG. 1 having all the components of the prior art transmission. The transmission system shown also includes a number of additional components also found in the third embodiment of the invention.

As shown the transmission system of FIG. 6 further comprises a first electrical machine 202 drivingly connected to the engine's accessory gearbox 44, a second electrical machine 204 drivingly connected to gearbox 182 and a third electrical machine 206 drivingly connected to the engine's low pressure spool via gearing 208. The electrical machines 202, 204 and 206 are of the type which may be operated in a forward mode as a generator, converting a mechanical work input into an electrical output, or in a reverse mode as a motor, converting an electrical input into a mechanical work output. For this purpose the machines may be either permanent magnet or electromagnetic induction type machines.

In the embodiment shown the three machines 202, 204 and 206 are electrically connected to a control 210 via separate lines 212, 214 and 216 respectively. Essentially the control 210 comprises switchgear adapted to isolate each of the machines 202, 204 and 206 from the transmission.

In this embodiment power may be selectively transferred from the engine's low pressure spool 16 to it's high pressure spool 20 by operating machine 206 as a generator and machine 202 as a motor powered by current from the generator 206. Alternatively power may be transferred from the engine's intermediate pressure spool 18 to it's high pressure spool 20 by operating machine 204 as a generator and machine 202 as a motor powered by the generator 204. Similarly power may be transferred from the engine's high pressure spool 20 to it's intermediate pressure spool 18 by operating machines 202 and 204 in reverse.

Figure 7:
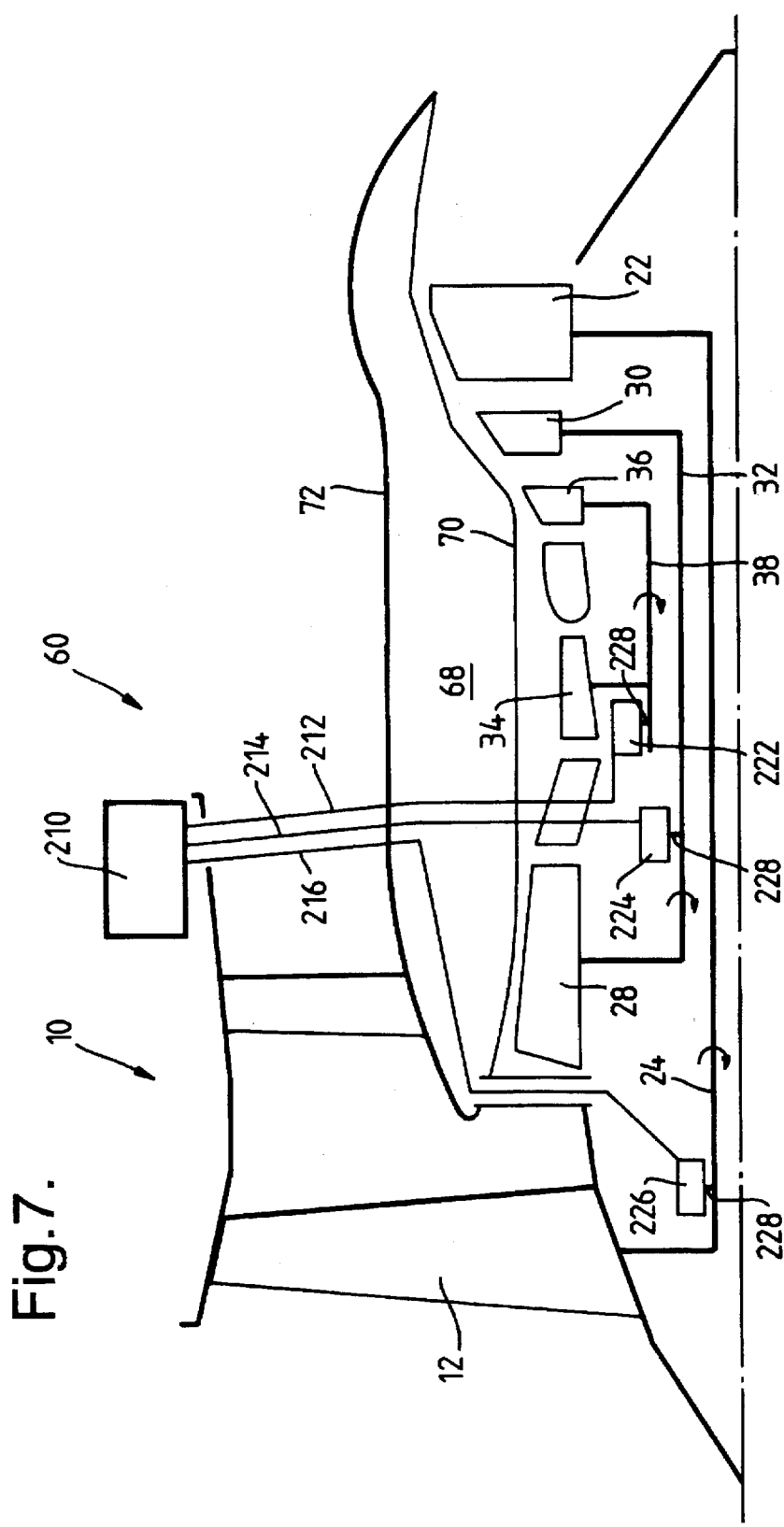
FIG. 7 shows the same multispool gas turbine engine as FIG. 5 incorporating a transmission system according to another aspect of the fourth embodiment of the invention, and, FIG. 8 shows the same multispool gas turbine engine as FIG. 5 incorporating a transmission system according to one aspect of a fifth embodiment of the invention, similar parts having the same reference numerals throughout.

A second aspect of this embodiment of the invention is shown in FIG. 7. In this aspect of the invention the electrical induction machines 202, 204 and 206 are replaced together with the mechanical drive transmission, with switched reluctance electrical machines 222, 224 and 226 respectively. Like the induction machines of the previous arrangement the switched reluctance machines are adapted top operate in both forward and reverse motor and generator modes. The advantage of the switched reluctance machines over the induction machines of the transmission of FIG. 6 resides in their power to size ratio. In the arrangement shown this allows machines 222, 224 and 226 to be embedded within the engine internal of the gas flow parts. In the arrangement shown the rotors 228 of machines 222, 224 and 226 are integral with engine shafts 38, 32 and 24 respectively.

The machines 222, 224 and 226 are connected electrically to control 210 along separate lines 212, 214 and 216 as before. Accordingly power may be transferred selectively between engine spools in the same way as in the embodiment of FIG. 6.

Figure 8:
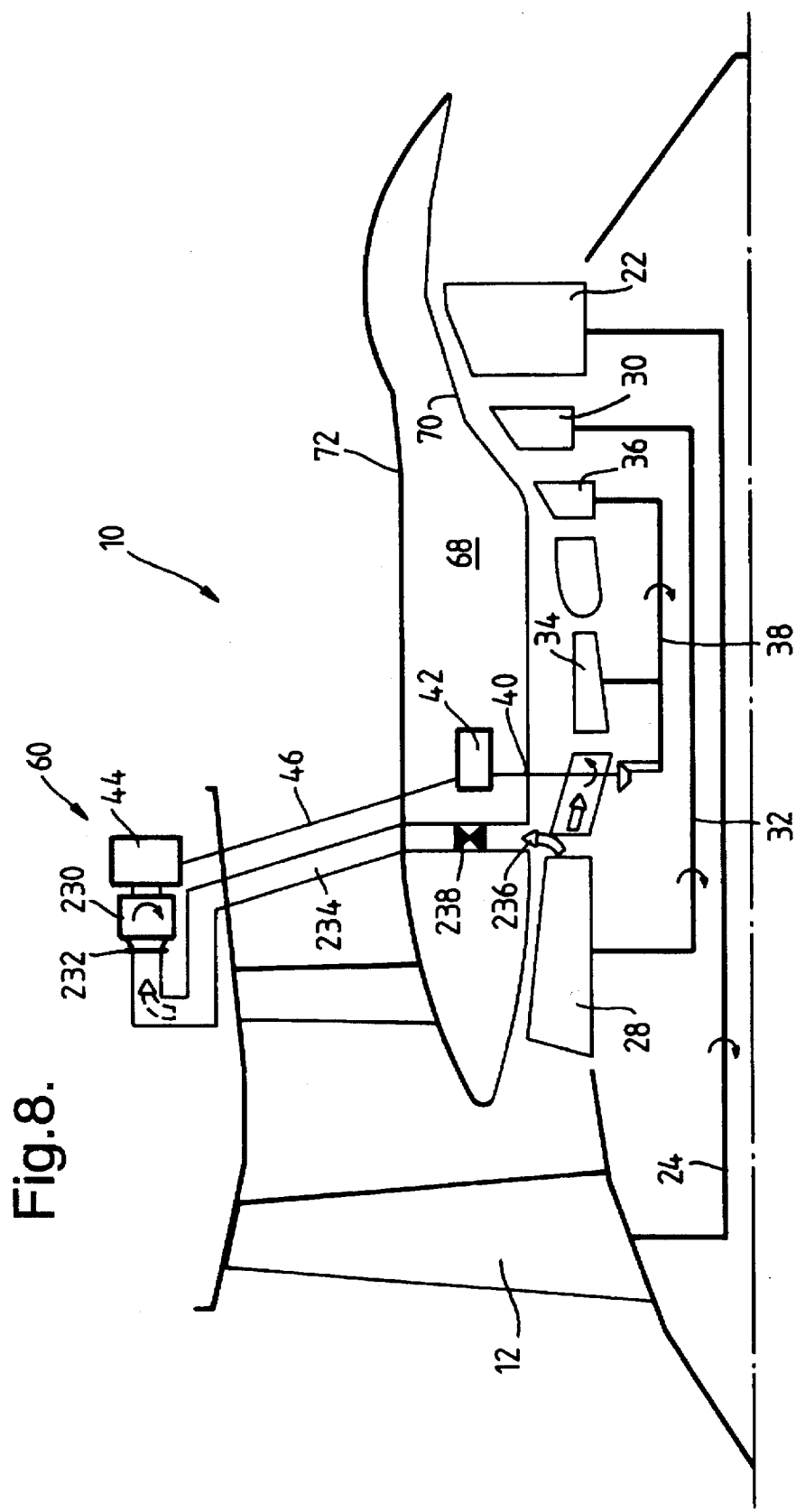

Referring now to FIG. 8 which shows a power transmission system according to a fifth embodiment of the invention. Like FIGS. 5 and 6, FIG. 8 shows schematically the gas turbine engine of FIG. 1 having all the components of the prior art transmission.

The transmission system shown also comprises an auxiliary air turbine 230 drivingly connected to the engine accessory gearbox 44. The auxiliary turbine 230 includes an inlet 232 which is in fluid flow communication with the downstream end of compressor 28.

Ducting 234 links the inlet 232 of the turbine to an engine bleed flow means 236 positioned at the outlet to compressor 28. A bleed flow control valve 238 is positioned adjacent compressor bleed 236 so that compressor discharge air may be bled selectively from the engine to drive the turbine 232.

During normal engine operation bleed flow control valve 238 remains closed and the engine functions as normal. At part speed operation, however, bleed flow control valve 238 opens and compressor discharge air is fed to the turbine 230. The increase in effective discharge area causes the load on the turbine section 30 to increase the thereby the rotational speed of the intermediate pressure spool 18 to fall. This contrasts with an increase in the high pressure spool rotational speed due to the work input from turbine 230 via the engine accessory drive.

Accordingly the transmission system shown in this embodiment enables power to be selectively transferred from the intermediate pressure spool to high pressure spool by selective operation of valve 238. Although not shown, the same effect could be achieved by adapting the turbine 232 to be driven by bleed gases bled from the inlet to turbine 30 instead of the outlet to compressor 28. In such an embodiment opening the bleed to turbine 232 would effectively reduce the area ratio of the turbine 30 and thereby reduce the rotational speed of the spool 18 whilst at the same time increasing the rotational speed of spool 20.

The arrangement shown in FIG. 5 offers a number of advantages over such alternative arrangements. In particular it enables the bleed flow generated as a result of flow control at part speed operation to be utilised in a more useful manner. In conventional arrangements the bleed flow is normally dumped to the bypass flow and as such has only a minor effect on cycle efficiency. The arrangement described however enables the bleed flow to be utilised to increase the flow capacity of the engines high pressure compressor 34 and thereby improve part speed engine performance.

Whilst described with reference to a three shaft gas turbine engine it will be appreciated that all embodiments of the invention are equally applicable to any multispool engine. In particular the invention may be utilised to improve the characteristics of a two shaft engine in much the same way as for the three shaft engine described. Moreover the part speed performance benefits would also be realised in a ground based gas turbine engine incorporating the present invention as well as for aircraft mounted gas turbine engines.

We claim:

1. A multispool gas turbine engine comprising:
   at least two independently rotatable engine spools;
   a plurality of power transfer machines coupled to the engine spools, including a first power transfer machine coupled to a first engine spool and a second power transfer machine coupled to a second engine spool, wherein said first power transfer machine is capable of operating either as a generator to take power from the first engine spool or as a motor to drive the first engine spool and said second machine is capable of operating either as a generator to take power from the second engine spool or as a motor to drive the second engine spool;
   power transmission means arranged to interconnect said plurality of power transfer machines; and
   means for selectively controlling an operation of said power transfer machines to selectively transfer power from at least one of the engine spools to at least one other of the engine spools.

2. A multispool gas turbine engine according to claim 1 wherein the engine is provided with a plurality of engine driven accessories and at least one of the power transfer machines is connected to drive the accessories.

3. A multispool gas turbine engine according to claim 1 adapted for mounting on an aircraft provided with a plurality of engine driven accessories and wherein at least one of the power transfer machines is connected to drive the accessories.

4. A gas turbine engine according to claim 1 wherein the power transmission means comprises at least two hydraulically coupled flow displacement machines each drivingly connected to a different one of the engine spools, and whereby at least one of the flow displacement machines is adapted to operate as a motor powered by working fluid energised by at least one other flow displacement machine operating as a pump.

5. A gas turbine engine according to claim 4 wherein the at least two of flow displacement machines are variable flow machines.

6. A gas turbine according to claim 5, wherein each of the at least two flow displacement machines are adapted to generate in a first mode as a pump and in a second mode as a motor.

7. A gas turbine engine according to claim 4 wherein the transmission means further comprises a control valve means for controlling the flow of working fluid between flow displacement machines.

8. A gas turbine engine according to claim 4 wherein each of the flow displacement machines is connected to a respective one of the engine spools through a gearbox.

9. A gas turbine engine according to claim 4 wherein the working fluid comprises engine oil diverted from an engine oil system.

10. A gas turbine engine according to claim 4 wherein a first of the flow displacement machines is connected to an engine low pressure spool and a second of the flow displacement machines to an engine high pressure spool.

11. A gas turbine engine according to claim 10 wherein the low pressure engine spool comprises a fan and a low pressure turbine interconnected by means of a load transmitting shaft and the first flow displacement machine is drivingly connected to a turbine end of the load transmitting shaft.

12. A gas turbine engine according to claim 10 wherein the first flow unit is hydraulically coupled to aircraft accessory power transfer means.

13. A gas turbine engine according to claim 10 wherein a third flow displacement machine is connected to an engine intermediate pressure spool.

14. A gas turbine engine according to claim 1 wherein the power transmission means comprises at least one variable ratio differential drive means adapted and arranged to transfer power between two of the engine spools.

15. A gas turbine engine according to claim 14 wherein the engine comprises a low pressure spool and a high pressure spool and the transmission means comprises at least one variable ratio differential drive means connecting the low pressure spool to the high pressure spool.

16. A gas turbine engine according to claim 15 wherein the low pressure engine spool comprises a fan and a low pressure turbine interconnected by means of a load transmitting shaft and the differential drive means is drivingly connected to the low pressure spool through a gearbox connected to the downstream end of the load transmitting shaft.

17. A gas turbine engine according to claim 16 wherein the gearbox is additionally drivingly connected to an aircraft accessory gearbox.

18. A gas turbine engine according to claim 1 wherein the power transmission means comprises a first gearbox means drivingly connected to at least two of the engine spools.

19. A gas turbine engine according to claim 18 wherein the transmission means includes clutch means positioned between at least one of the spools and the gearbox means thereby to provide for selective power transfer between respective engine spools.

20. A gas turbine engine according to claim 19 wherein the engine comprises a low pressure spool and a high pressure spool and the first gearbox means is drivingly connected to an engine accessory gearbox means, and whereby the high pressure spool is adapted to drive the accessory gearbox means through the first gearbox means independently of clutch means engagement.

21. A gas turbine engine according to claim 1 wherein the power transmission means comprises at least one electrical machine drivingly connected to an engine spool and adapted to operate as a generator, and at least one electrical machine drivingly connected to a further one of the engine spools and adapted to operate as a motor powered by current from the generator.

22. A gas turbine engine according to claim 21 wherein the electrical machines are electrical induction machines each adapted to operate in a forward mode as a motor and in a reverse mode as a generator.

23. A gas turbine engine according to claim 22 wherein each of the electrical induction machines are drivingly connected to their respective engine spools through reduction gearing.

24. A gas turbine engine according to claim 21 wherein the electrical machines are switched reluctance machines each adapted to operate in a forward mode as a motor and in a reverse mode as a generator.

25. A gas turbine engine according to claim 22 wherein the rotors of the switched reluctance machines are integral with the respective engine spools.

26. A gas turbine engine according to claim 1 wherein the power transmission means comprises an engine bleed flow means and an auxiliary turbine drivingly connected to at least one of the engine spools, the auxiliary turbine being adapted to receive engine flow from the bleed flow means such that, in use, engine bleed flow may be used to drive said turbine and thereby augment the power of the engine spool.

27. A gas turbine engine according to claim 26 wherein the bleed flow means is adapted to deliver air from the compressor section of at least one of the engine spools to the auxiliary turbine.

28. A gas turbine engine according to claim 27 wherein the auxiliary turbine receives air from a first of the engine spools and drivingly connects to a second of the engine spools.

29. A gas turbine engine according to claim 26 wherein the engine comprises a low pressure spool and a high pressure spool and the auxiliary turbine is drivingly connected to the engine high pressure spool.

30. A gas turbine engine according to claim 26 wherein the auxiliary turbine is drivingly connected to said spool through reduction gearing.

31. A gas turbine engine according to claim 1 wherein the engine is a ducted fan engine.

* * * * *

UNITED STATES PATENT AND TRADEMARK OFFICE
CERTIFICATE OF CORRECTION

PATENT NO.   : 5,694,765
DATED        : December 9, 1997
INVENTOR(S)  : Paul M. HIELD et al.

It is certified that error appears in the above-indentified patent and that said Letters Patent is hereby corrected as shown below:

On the title page, in section [75], insert --John Sharp, Derby, England--.

Signed and Sealed this

Seventeenth Day of March, 1998

Attest:

BRUCE LEHMAN

*Attesting Officer*        *Commissioner of Patents and Trademarks*